United States Patent
Fay et al.

(10) Patent No.: US 8,153,268 B1
(45) Date of Patent: Apr. 10, 2012

(54) POLYMER TO METAL BONDING AND COMPOUNDS AND COMPOSITIONS USEFUL THEREFOR

(75) Inventors: Nigel Fay, Kildare (IE); Brendan J. Kneafsey, Dublin (IE); Darren Nolan, Dublin (IE); Susan Warren, Wexford (IE)

(73) Assignee: Loctite (R&D) Limited, Dublin (IE)

( * ) Notice: Subject to any disclaimer, the term of this patent is extended or adjusted under 35 U.S.C. 154(b) by 1050 days.

(21) Appl. No.: 12/055,908

(22) Filed: Mar. 26, 2008

(51) Int. Cl.
*B32B 15/06* (2006.01)
*C07F 7/10* (2006.01)

(52) U.S. Cl. ........ 428/448; 156/325; 156/326; 156/329; 428/450; 428/451; 556/419; 556/421

(58) Field of Classification Search .................. 156/325, 156/326, 329; 428/448, 450, 451; 556/419, 556/421
See application file for complete search history.

(56) References Cited

U.S. PATENT DOCUMENTS

| | | | |
|---|---|---|---|
| 2,386,452 | A | 10/1945 | Fleming |
| 3,542,639 | A | 11/1970 | Manino |
| 4,031,120 | A | 6/1977 | Gervase |
| 6,409,874 | B1 | 6/2002 | Van Der Aar et al. |
| 6,756,079 | B2 | 6/2004 | van Doij et al. |
| 2005/0079364 | A1 | 4/2005 | van Doij et al. |
| 2006/0235156 | A1 | 10/2006 | Griswold et al. |
| 2007/0056469 | A1 | 3/2007 | van Doij et al. |

FOREIGN PATENT DOCUMENTS

| | | |
|---|---|---|
| EP | 1167455 | 1/2002 |
| GB | 1526953 | 10/1978 |
| WO | WO 04/000851 | 12/2003 |
| WO | WO 2004/078867 | 9/2004 |

OTHER PUBLICATIONS

J.J. D'Amico, C.C. Tung and L.A. Walker, *J. Am. Chem. Soc.*, 5957 (1959).
XP002543589, Feb. 27, 2006, Jin-Heng Li et al.

*Primary Examiner* — D. S. Nakarani
(74) *Attorney, Agent, or Firm* — Steven C. Dauman

(57) ABSTRACT

A compound comprising at least one alkoxy silane moiety; and at least one moiety selected from a nitrosobenzene or a nitrosobenzene precursor and combinations thereof are provided and used in polymer to metal in particular rubber to metal bonding. The nitrosobenzene precursor may be at least one of a quinone dioxime or a quinone oxime.

21 Claims, No Drawings

POLYMER TO METAL BONDING AND COMPOUNDS AND COMPOSITIONS USEFUL THEREFOR

BACKGROUND

1. Field

Adhesive compositions suitable for use in polymer-to-metal, for example elastomer-to-metal such as rubber-to-metal, bonding applications are provided. One aspect provides compounds suitable for use in such adhesive composition rubber to metal bonding applications.

2. Brief Description of Related Technology

Polymer to metal and in particular rubber to metal bonding has been practiced for many years. There are many applications for formulations which achieve polymer or rubber to metal bonding. Rubber to metal bonding is widely used to bond different metals to a natural or synthetic rubber. Polymer to metal bonding is carried out for many reasons.

One aspect of rubber to metal bonding is to combine the structural strength of the metal with the elastomeric properties of the rubber.

Accordingly, metal and polymers such as rubber are often bonded to each other for impact absorption applications, such as in bearings, wheels, shock absorbers, moving arms etc. Such components can be utilised on a very small scale, for example in PC components or on a very large scale for example in constructions such as bridges and buildings. Noise reduction may also be achieved by utilising metal to rubber bonding. It is accepted that tremendous forces can be experienced by any component that comprises metal and rubber bonded together. Accordingly, it is desirable to provide metal to rubber bonding, which can withstand significant forces, such a compressive or extensive pressures including shocks without having the metal or the rubber separate from each other. There are many other applications including in tyre production where internal wire reinforcements for the tyre are bonded to the rubber of the tyre.

Generally, an adhesive formulation is provided to bond a selected rubber to a selected metal substrate.

Traditional rubber-to-metal bonding technology incorporates a two-step system, where in a first step a primer is applied and thereafter in a second step an adhesive is applied. The primer ordinarily consists of solutions or suspensions of chlorinated rubber and phenolic resins containing reactive groups, and also pigments such as titanium dioxide, zinc oxide, carbon black etc. The primer is generally applied as a thin layer onto a treated (cleaned) surface of a metallic component such as treated steel component for example a component that has been grit blasted or chemically treated.

The adhesive ordinarily consists of a large range of rubber materials and cross-linkers. These include, but are not restricted to, chlorinated and bromochlorinated rubbers, aromatic nitrosobenzene compound and bismaleimide as cross-linkers, xylene, perchloroethylene and ethylbenzene as solvents, and also some lead or zinc salts. The adhesive layer is generally the link between the primed metal and the rubber.

Common cross-linkers that have been employed in rubber-to-metal bonding technology are aromatic nitroso compounds, such as p-dinitrosobenzene.

In the many fields where rubber to metal bonding is employed there are numerous opportunities to address several types of problems, including bond strength and durability, sample preparation and ease of application of the adhesive, single coat versus two-coat systems, reduced toxicity and improved properties for the environment, amongst others.

Many formulations for rubber to metal bonding exist. For example silanes have been used as corrosion inhibitors and as rubber-to-metal bonding adhesion promoters. Reducing VOCs (volatile organic compounds), and reducing the costs, such as those associated with cobalt salts, which are used as an adhesion promoter in certain systems is desirable for example as set out in the following US Patent Application Publication Nos. US2007/0056469A1 and US2005/0079364A1, and U.S. Pat. No. 6,756,079B2 and U.S. Pat. No. 6,409,874. Specific silanes noted are bis(trimethoxypropyl)amine and bis(triethoxypropyl)tetrasulfide, generally in use together in a ratio of 1:3 respectively, in an ethanol/water solution. It is noteworthy that the silanes are thus hydrolysed, either separately or together, prior to application to the metal.

International (PCT) patent publication No. WO2004/000851 to Qinetiq Ltd, describes a process for silane hydrolysis with a good degree of control. The process is carried out in solution in the presence of water and a catalyst. International (PCT) patent publication No. WO2004/078867 to Lord Corporation describes a single coat solvent-based adhesive designed to bond thermoplastic elastomers containing an alkoxy silane/urethane adduct and a chlorinated polymer. Methods of synthesis and formulation are described within this patent document. U.S. Pat. No. 4,031,120 to Lord Corporation describes a composition comprising an isocyanate functional organosilane, in combination with a polyisocyanate and an aromatic nitroso compound. The resulting system is described as a one-coat adhesive for bonding a variety of elastomeric materials to metals and other substrates.

Generally it is desirable that bonding is achieved during a vulcanisation step like compression moulding, transfer moulding, injection moulding and autoclave heating, for example with steam or hot air. For example semi-solid rubber can be injected into a mould. The semi-solid rubber is then cross-linked into a fully cured rubber and the bond with the substrate is formed at the same time.

Certain requirements of the curing system are desirable. This includes, ease of processing; stability (for example avoiding sedimentation), ease of application, fast drying (to allow handling without fouling); good wetting properties, and good curing strengths. Curing should be achieved independently of the type of elastomer (rubber) employed and also independently of the type of substrate. It will be appreciated that some rubbers are blended materials and accordingly it is desirable that good curing is achieved with such blended materials. Suitably consistent curing is achieved under various process parameters. Durability it also desirable. For example the rubber/metal joint, should be durable under relatively high mechanical stress for example under high pressure and even if immersed in an aggressive atmosphere, for example a hot liquid such as oil.

Notwithstanding the state of the technology it would be desirable to provide a compound and composition to bond polymeric substrates to metal substrates that remedies some or all of the deficiencies of that which was known before and/or provides alternatives to the existing technologies so that consumers have more possibilities from which to choose.

SUMMARY

Compounds suitable for use in rubber to metal bonding are provided.

In a first aspect a compound is provided comprising:
a) at least one alkoxy silane moiety; and
b) at least one moiety selected from a nitrosobenzene or a nitrosobenzene precursor and combinations thereof. Such compounds assist in the formation of rubber to metal bonds.

They can be easily applied at the interface between the rubber and the metal and assist in developing strong and durable bonds during the curing process.

The so-described compounds and formulations may result in a number of advantages. For example a one-part adhesive system may be formulated. Such systems are readily applied to substrates in a single step using convenient and conventional techniques, for example spraying or dipping. Compounds and formulations as so provided may also have reduced toxicity as compared to conventional dinitrosobenzene formulations. Compounds and formulations as so provided can achieve bond strengths in a 100% rubber failure mode that demonstrate hot water and solvent resistance. Rubber failure relates to failure of the rubber before the bond fails. That is the bond is stronger than the rubber substrate.

In contrast to conventional systems the adhesive systems of the invention can be applied to the unvulcanised rubber, (as distinct from the metal), prior to vulcanisation and bond formation, and upon subsequent vulcanization a bond results. This means that the adhesive system may be applied to either the rubber or the metal substrate. Conventional systems do not form a bond if applied in this manner.

The nitrosobenzene precursor may be at least one of a quinine dioxime or a quinine oxime. It will be appreciated that the nitrosobenzene precursor may form in-situ a nitrosobenzene structure. It has been found that such structures assist in the formation of desirable bonds.

The silane moiety may be of the structure:

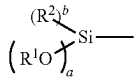

where 'a' can be 1-3 and 'b' can be 0-2, but if a=3, b=0; or if a=2, b=1; so that at least one alkoxy group is present;

$R^1$ can be selected from the group consisting of H, $C_1$-$C_{24}$ alkyl, $C_3$-$C_{24}$ acyl, preferably from $C_1$-$C_4$ alkyl and wherein when a≧1 at least one $R^1$ is not hydrogen; and $R^2$ can be selected from $C_1$-$C_{24}$ alkyl and $C_3$-$C_{24}$ acyl, preferably from $C_1$-$C_4$ alkyl.

The compounds may be reaction products derived from an isocyanate or isothiocyanate and an active hydrogen compound, such as —$NH_x$ (where x=1 or 2), —SH, or —OH. In this manner the so-described compounds should contain at least one linkage described by:

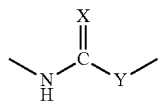

where X can be S or O, and Y includes —$NH_x$ (where x=1 or 2), —S, or —O.

The general structure for these compounds is shown below:

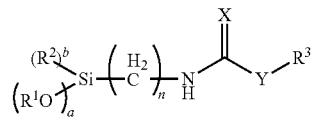

where 'a' can be 1-3 and 'b' can be 0-2; but if a=3, b=0; or if a=2, b=1; so that at least one alkoxy group is present;

$R^1$ can be selected from the group consisting of H, $C_1$-$C_{24}$ alkyl, $C_3$-$C_{24}$ acyl, preferably from $C_1$-$C_4$ alkyl and wherein when a≧1 at least one $R^1$ is not hydrogen; and $R^2$ can be selected from $C_1$-$C_{24}$ alkyl and $C_3$-$C_{24}$ acyl, preferably from $C_1$-$C_4$ alkyl;

n can be 1-5;

X can be O or S;

Y can be —O, —S, or —$NH_x$ (where x=1 or 2); and $R^3$ is a moiety comprising nitrosobenzene, quinone dioxime or quinone oxime.

Structures for $R^3$, showing the linkage through 'Y', can include:

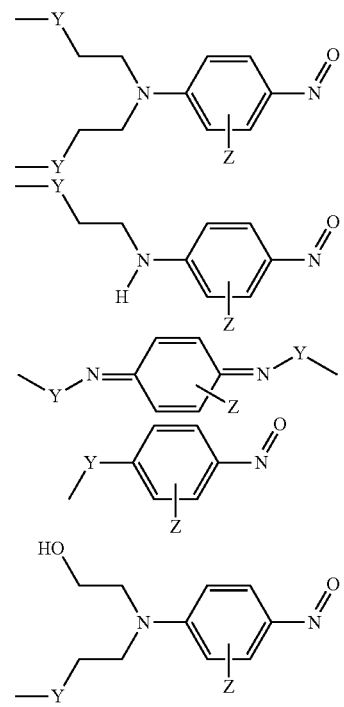

wherein Z indicates that the rings of the above structures can optionally be mono-, di-, tri- or tetrasubstituted with the group consisting of alkyl, cycloalkyl, alkoxy, aralkyl, alkaryl, arylamine, arylnitroso, amino, halogen and combinations thereof, and further wherein the substituents can either be the same or different on each carbon atom of the ring.

A compound according to the present invention may have the general structure:

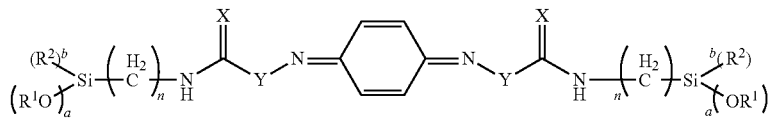

where n can be 1-5;
'a' can be 1-3 and 'b' can be 0-2; 'a' can be 1-3 and 'b' can be 0-2; but if a=3, b=0;
or if a=2, b=1; so that at least one alkoxy group is present;
$R^1$ can be selected from the group consisting of H, $C_1$-$C_{24}$ alkyl, $C_3$-$C_{24}$ acyl, preferably from $C_1$-$C_4$ alkyl and wherein when a≧1 at least one $R^1$ is not hydrogen; and
$R^2$ can be selected from $C_1$-$C_{24}$ alkyl and $C_3$-$C_{24}$ acyl, preferably from $C_1$-$C_4$ alkyl.
X can be O or S;
Y can be –O, —S, or —$NH_x$ (where x=1 or 2).

The invention also provides for oligomeric and co-oligomeric compounds composed of monomers comprising:
a) at least one alkoxy silane moiety; and
b) at least one moiety selected from a nitrosobenzene or a nitrosobenzene precursor and combinations thereof.

$R^1$ can be selected from the group consisting of H, $C_1$-$C_{24}$ alkyl, $C_3$-$C_{24}$ acyl, preferably from $C_1$-$C_4$ alkyl;
$R^2$ can be selected from the group consisting of $OR^1$, $C_1$-$C_{24}$ alkyl and $C_3$-$C_{24}$ acyl, and wherein when $R^2$=$OR^1$ at least one $R^1$ is not hydrogen;
$R^4$ can be selected from the group consisting of acrylate, aldehyde, amino, anhydride, azide, maleimide, carboxylate, sulphonate, epoxide, ester functional, halogens, hydroxyl, isocyanate or blocked isocyanate, sulphur functional, vinyl and olefin functional, or polymeric structures;
X can be O or S;
Y can be —O, —S, or —$NH_x$ (where x=1 or 2); and
$R^3$ is a moiety comprising nitrosobenzene, quinone dioxime or quinone oxime.

Specific examples of compounds of the present invention include the following:

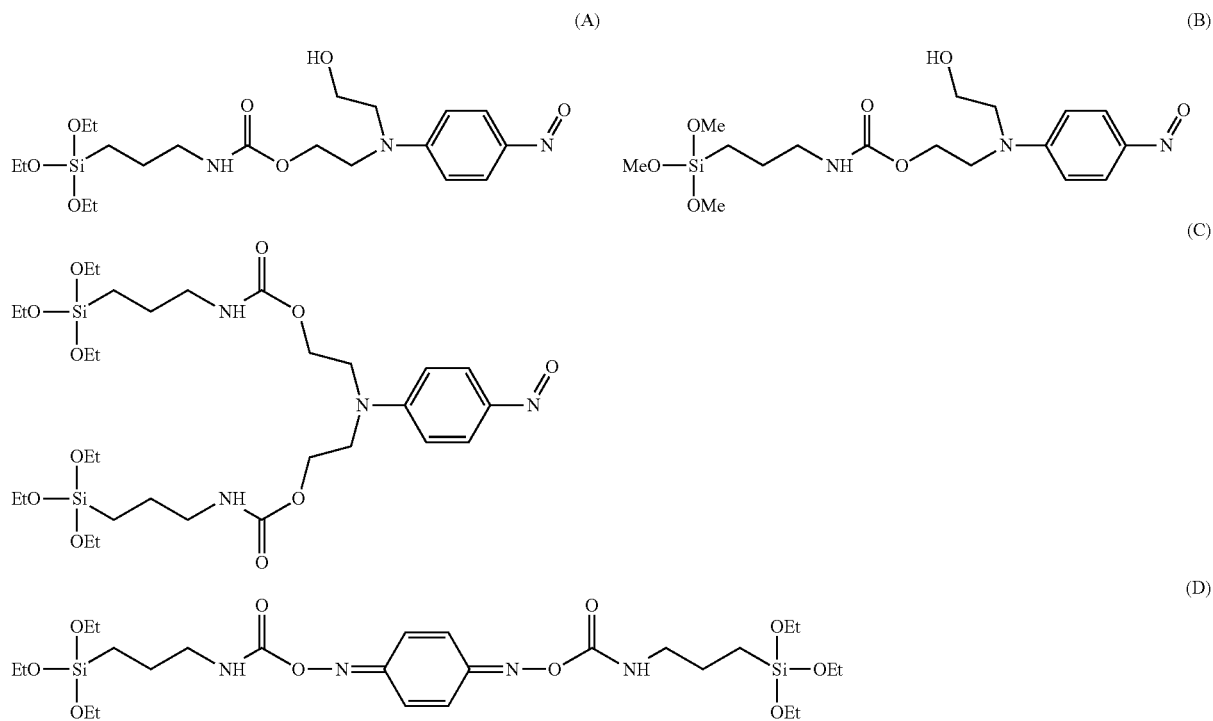

wherein a co-oligomeric compound is composed of different monomers. Such oligomeric and co-oligomeric compounds may be of the general formula:

The reaction scheme for the synthesis of (A) is below (all compounds are made in an analogous method).

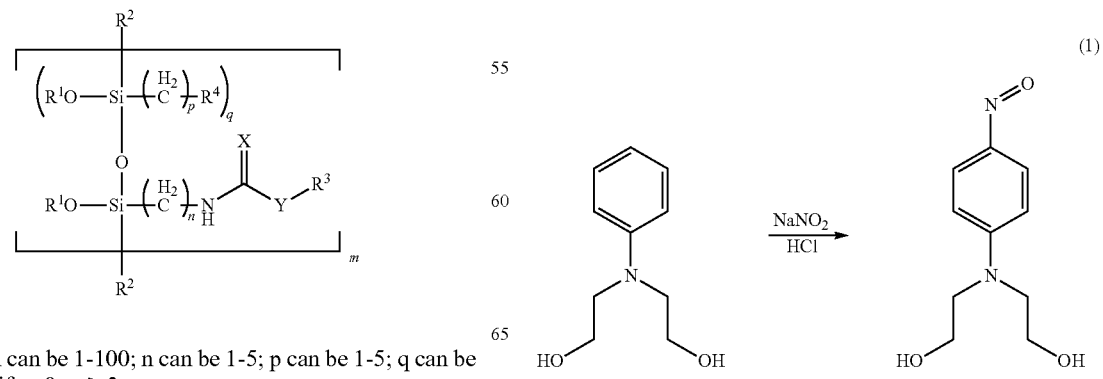

wherein m can be 1-100; n can be 1-5; p can be 1-5; q can be 0-50; and if q=0, m≧2

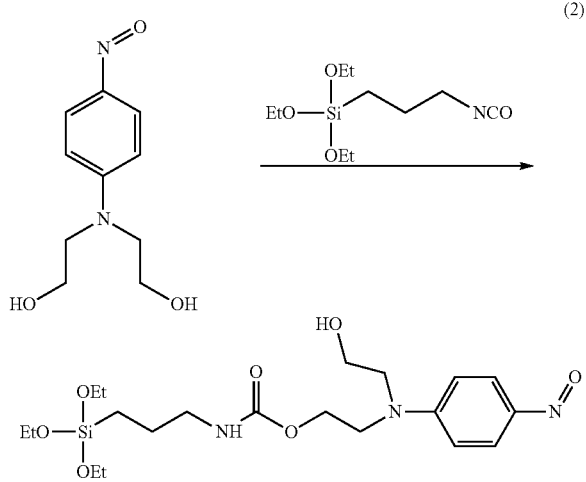

(2)

It will be appreciated that compositions suitable for bonding metal to rubber may be formulated utilising appropriate amounts of one or more of the so-described compounds.

Accordingly, a composition for bonding substrates together is also provided where the composition comprises:
(i) at least one compound comprising;
a) at least one alkoxy silane moiety; and
b) at least one moiety selected from a nitrosobenzene or a nitrosobenzene precursor and combinations thereof; and
(ii) a suitable carrier vehicle for the compound. It will be appreciated that any suitable carrier vehicle may be utilised. It is desirable that the carrier vehicle should be environmentally friendly. Such compositions are suitable for use in bonding a substrate such as a metal substrate to a natural or synthetic rubber.

It will be appreciated that within these compositions the compound can react in-situ to form a nitrosobenzene moiety. It is also contemplated that the compound can react in-situ to form a dinitrosobenzene moiety. For example for particularly good bonding it may be desirable for the compound to react in-situ to form a para-nitrosophenol moiety.

Also provided is a process for bonding two substrates together comprising applying the so-described composition to a bonding surface of at least one of the substrates and bringing the bonding surfaces of the substrates together. For example a first substrate may be constructed from a natural or synthetic rubber to be bonded to another substrate. The other or second substrate may be a metallic substrate. Generally the alkoxy silane moiety of the compound will anchor to a metal surface. The moiety selected from a nitrosobenzene or a nitrosobenzene precursor will generally become anchored to the rubber. Accordingly each end of the molecule is functionalised and assists in bonding the materials together with a strong and durable bond.

Thus, a metal coated with an adhesive composition as so described may be adhered to a polymeric material, for example a rubber composition, by applying the polymeric material in an uncured state onto the metal coated with the adhesive composition and curing the polymeric material thereon to bond it to the metal. In the case of a rubber polymeric material the uncured rubber may be vulcanized via heat and pressure over a period of time to cure the rubber, resulting in bonding of the rubber to the metal.

Such bonding to metals is achieved through the nitroso groups which are capable of reacting with polymers, in particular a polymer with alkene functionality within the polymer chain. Such a reaction produces a variety of cross-links for example between the nitroso group and a rubber material. The materials of the invention are thought to reduce free nitroso groups as the nitroso group is within a molecular structure. In the reaction of the nitroso and the silane, the nitroso reacts with alkene functionality within the natural rubber while the silane forms the bond with the metal.

Dinitrosobenzene is known to be a very effective cross-linker in adhesive formulations, and often results in bonds that are characterised by high permanent strength and by high resistance to aggressive media. However, unreacted free nitroso materials such as dinitrosobenzene can give rise to continuing vulcanization in the event of composition subsequent heat treatment, resulting in unwanted embrittlement of the bond. The present invention may alleviate this problem due to the fact that the reaction product of the nitroso and the silane would contain no free nitroso materials such as dinitrosobenzene and thus would not be free to undergo further vulcanization. Reducing the hazards associated with conventional systems is also important.

Combinations of silanes may be employed in the present invention. For example one or more additional silanes may be included within compositions of the present invention. These silanes are generally those comprising an amine group and include those of the formula:

$$\left[ R'O\!-\!\underset{\underset{OR^1}{|}}{\overset{\overset{OR^1}{|}}{Si}}\!-\!R^2\!\!\left[\!-\!X\!-\!\!\left[\!R^5\right]_y\right.\right]_n$$

where:
n is either 1 or 2;
y=(2-n)
each $R^1$ can be selected from the group consisting of $C_1$-$C_{24}$ alkyl and $C_2$-$C_{24}$ acyl;
each $R^2$ can be selected from the group consisting: $C_1$-$C_{30}$ aliphatic groups, substituted $C_3$-$C_{30}$ aromatic groups, and unsubstituted $C_3$-$C_{30}$ aromatic groups;
$R^5$ can be selected from the group consisting hydrogen, $C_1$-$C_{10}$ alkylene,
$C_1$-$C_{10}$ alkylene substituted with one or more amino groups, $C_2$-$C_{10}$ alkenylene substituted with one or more amino groups, $C_6$-$C_{10}$ arylene, and $C_7$-$C_{20}$ alkylarylene;
X is either:

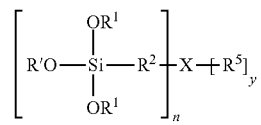

where each $R^3$ can be selected from the group consisting hydrogen, $C_1$-$C_{30}$ aliphatic groups, and $C_6$-$C_{30}$ aromatic groups; and
$R^4$ can be selected from the group consisting $C_1$-$C_{30}$ aliphatic groups, and $C_6$-$C_{30}$ aromatic groups; and
where when n=1, at least one of the $R^3$ and the $R^5$ is not hydrogen.

Preferred aminosilanes include bis-silyl amino silanes such as those having two trisubstituted silyl groups. The substituents may be individually chosen from $C_1$-$C_{20}$ alkoxy, $C_6$-$C_{30}$ aryloxy and $C_2$-$C_{30}$ acyloxy. Suitable bis-silyl aminosilanes for use within the present invention include:

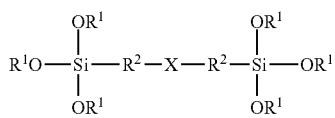

where:
each $R^1$ can be selected from the group consisting $C_1$-$C_{24}$ alkyl and $C_2$-$C_{24}$ acyl;
each $R^2$ can be selected from the group consisting $C_1$-$C_{20}$ aliphatic groups, and $C_6$-$C_{30}$ aromatic groups;
X is either:

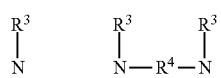

where each $R^3$ can be selected from the group consisting hydrogen, $C_1$-$C_{20}$ aliphatic groups, and $C_6$-$C_{30}$ aromatic groups; and
$R^4$ can be selected from the group consisting $C_1$-$C_{20}$ aliphatic groups and $C_6$-$C_{30}$ aromatic groups.

Examples of some bis-silyl aminosilanes include: bis-(trimethoxysilylpropyl)amine, bis-(triethoxysilylpropyl)amine, bis-(triethoxysilylpropyl)ethylene diamine, N-[2-(vinylbenzylamino)ethyl]-3-aminopropyltrimethoxy silane, and aminoethyl-aminopropyltrimethoxy silane. Such additional silanes may be included in the range from 1:3 to 3:1 relative to the compounds of the present invention. Such mixing can result in excellent rubber-to-metal bonding.

In particular the inclusion of the amino bis(propyltrimethoxysilane) in addition to the nitroso silane enhances the rubber to metal bond strength significantly. It is thought that the amino bis(propyltrimethoxysilane) has multiple functions within the formulation. This includes aiding the film forming and "wetting" of the metal surface.

A significant difference between the present invention and the prior art is that in the present invention the silanes can be "significantly unhydrolysed", meaning that they are utilised in an unhydrolysed state. This arises as the materials can be applied neat and/or without any water being present. In the prior art purposeful addition of water was made to the solution in order to hydrolyse the silanes.

The amino silane(s) and nitroso silane may be independently hydrolysed and/or mixed and hydrolysed to form the final silane solution. 5% water solutions are generally sufficient to effectively hydrolyse the silanes. Alternatively the silanes can be added to a neat solvent, used as received, without the addition of water for intentional promotion of hydrolysis.

Generally, the final silane solution applied to the metal substrate may vary in the silane concentration and ratio (amino silane to nitroso silane) over a wide range and still provide beneficial results. The final solution should contain a total silane concentration of at least approximately 0.1% by volume, i.e. the concentration of the combination of amino silanes and nitroso silanes in the final solution. Solutions having a silane concentration of between about 0.1% and about 10% by volume generally provide strong bonding without waste of valuable silanes.

Excellent adhesion between polymeric materials, such as rubber compositions, and metals, with minimal waste of silane solution may be realized through the use of the compounds and compositions as so described. With reference to their use in adhesive applications, the compositions of the present invention are generally thinner than the compositions present in the traditional adhesive systems for rubber to metal bonding, without any loss in performance characteristics. Composition thickness may be determined by the concentration of the reaction product of the nitroso and the silane, and are in the range of 0.1 to 12 µm, and more preferably in the range of 0.5 to 10 µm.

Many different metals may be treated with the composition described in this invention, and may be bonded to polymeric materials. These metals include, but are not limited to, zinc and zinc alloys such as zinc-nickel and zinc-cobalt alloys, metal substrates having zinc-containing coatings, steel and in particular cold rolled and carbon steel, aluminium and aluminium alloys, copper and copper alloys such as brass, and tin and tin alloys including metal substrates having tin-containing coatings.

DETAILED DESCRIPTION

The rubber composition involved in rubber to metal bonding using the described methods in the current invention may further include known additives common to rubber compositions. These include reinforcing carbon blacks; inactive fillers such as calcium carbonates, chalks, talcs, or metal oxides; accelerator systems; vulcanization retarders; promoters such as zinc oxide or stearic acid; plasticizers such as aromatic, paraffinic, naphthenic and synthetic mineral oils; ageing, light-protecting ozone-protecting, fatigue, coloration, and processing auxiliaries; and sulfur. Commonly these additives may be present at a quantity of about 0.1 parts to about 80 parts per 100 parts by weight of the rubber composition.

Hydrolysis, formation of silanol groups, i.e. SiOH, will generally occur efficiently within the pH range of 3-7. At pHs above or below this range, silane condensation may occur by a process where the silanol self-condenses to form a siloxane. During this process the hydroxyl molecules of the adjacent molecules react with one another to eliminate molecules of water and form a cross-linked siloxane structure containing —Si—O—Si—O—Si— functionality.

To accelerate silane hydrolysis and inhibit silane condensation during the hydrolysis step, the pH of the silane solution may be maintained below about 7 and preferably in the mildly acidic range from about 4 to 6.5 (particularly for hydrolysis of the bis-silyl aminosilanes). This can be achieved by addition of one or more compatible acids. For example, organic acids such as acetic acid, oxalic acid, formic acid, propionic acid, may be added to the hydrolysing solution to adjust the pH. Sodium hydroxide, or other compatible bases, may also be used, when needed, to raise the pH of the silane solution. Some silanes provide a mildly acidic pH solution when mixed with water and may not need a pH adjustment to accelerate hydrolysis. The pH ranges discussed with respect to preparing the silane-hydrolyzing solutions should not be confused with the pH of the final silane solution applies to the metal substrate.

The hydrolysing silane solutions may further include one or more of compatible solvents. Alcohols are generally used for solubilising and hydrolysing silanes. Suitable alcohols include, without limitation, methanol, ethanol, n-propanol, isopropanol, n-butanol, sec-butanol, tert-butanol, and longer aliphatic alcohols. The ratio of water to solvent in the hydrolysed silane solution (as applied to the metal substrate, by volume) may be between about 1:99 and about 99:1, and preferably between 1:1 and 1:20.

Prior to application of the silane solution, the metal surface to be coated may be cleaned to allow better adhesion. For example cleaning with solvent or alkaline material. Application can then be conducted by a variety of methods, including dipping, spraying, brushing or wiping the solution onto the metal. It has been suggested that for improving rubber adhesion the coating remain partially cross-linked prior to vulcanisation. For this reason, the coating is usually air dried at room temperature as heat drying can cause a higher degree of cross-linking that will result in poorer adhesion between the rubber and the metal surface.

Compounds of the invention were made as set out below:

EXAMPLES

Compounds A, 13, C and D (above) were synthesised according to the following experimental procedure and as illustrated in the reaction scheme above.

Reaction (1) (vide supra) was carried out as outlined in J. J D'Amico, C. C. Tung and L. A. Walker, *J. Am. Chem. Soc.*, 5957 (1959).

Reaction (2): γ-Isocyantopropyltriethoxysilane (GE Bayer Silicones A-1310) (2.35 g, 9.5 mmol) was solvated in 10 mL of anhydrous THF in a 50 mL round bottom flask. The reaction flask was flushed with nitrogen and charged with N,N-bis-(2-hydroxyethyl)-4-nitroso-aniline g, 9.5 mmol), followed by a catalytic quantity of dibutyltin dilaurate (1.5 μmol). The reaction was refluxed for an additional 2 hours under nitrogen. Consumption of the isocyanate (2275 cm$^{-1}$) was monitored using infrared spectroscopy. The solvents were removed under reduced pressure to give the product in a quantitative yield.

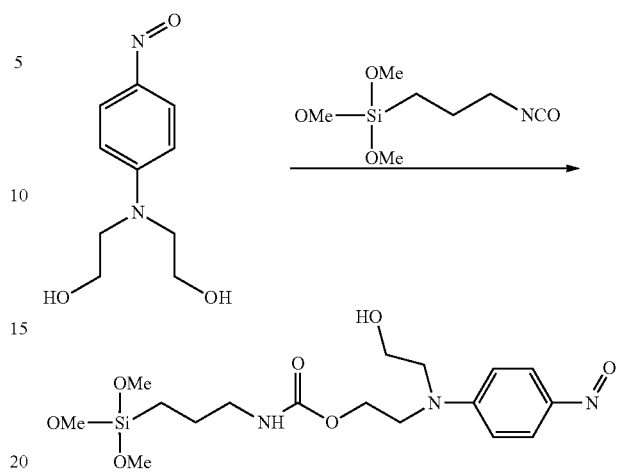

(3)

Reaction 4: γ-Isocyantopropyltriethoxysilane (GE Bayer Silicones A-1310) (2.35 g, 9.5 mmol) was solvated in 10 mL of anhydrous THF in a 50 mL round bottom flask. The reaction flask was flushed with nitrogen and charged with N,N-bis-(2-hydroxyethyl)-4-nitroso-aniline (1 g, 4.75 mmol), followed by a catalytic quantity of dibutyltin dilaurate (1.5 μmol). The reaction was refluxed for an additional 5 hours under nitrogen. Consumption of the isocyanate (2275 cm$^{-1}$) was monitored using infrared spectroscopy. The solvents were removed under reduced pressure to give the product in a quantitative yield.

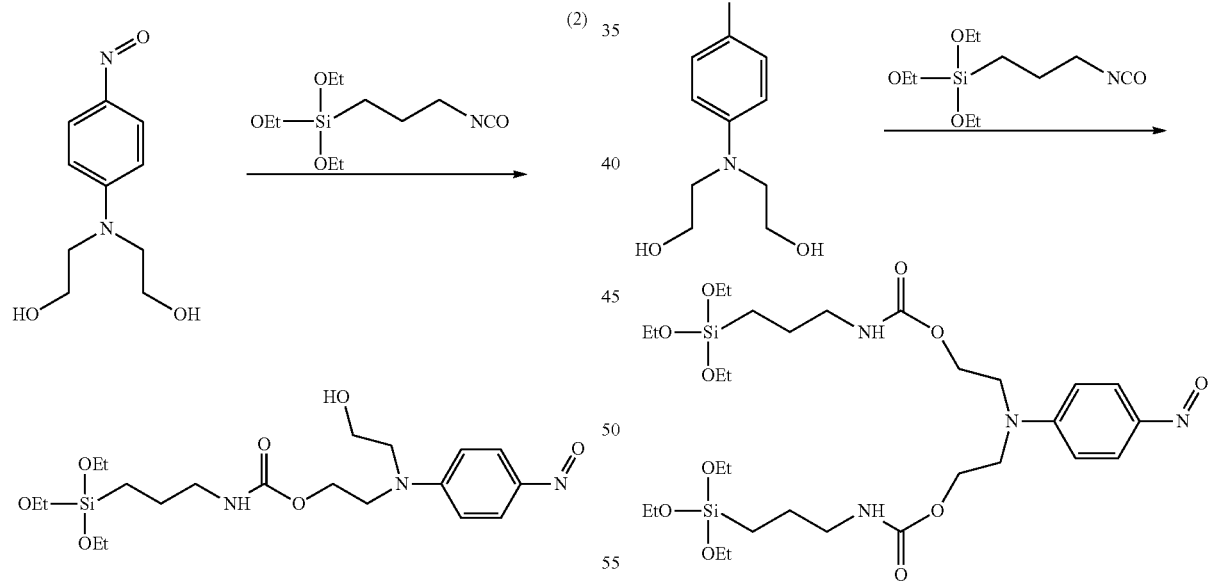

(2)

(4)

Reaction 3: γ-Isocyantopropyltrimethoxysilane (ABCR GmbH) (1.5 g, 7.3 mmol) was solvated in 8 mL of anhydrous THF in a 50 mL round bottom flask. The reaction flask was flushed with nitrogen and charged with N,N-bis-(2-hydroxyethyl)-4-nitroso-aniline (1.53 g, 7.3 mmol), followed by a catalytic quantity of dibutyltin dilaurate (1 μmol). The reaction was refluxed for an additional 2 hours under nitrogen. Consumption of the isocyanate (2275 cm$^{-1}$) was monitored using infrared spectroscopy. The solvents were removed under reduced pressure to give the product in a quantitative yield.

Reaction 5: γ-Isocyantopropyltriethoxysilane (GE Bayer Silicones A-1310) (10.68 g, 43.18 mmol) was solvated in 30 mL of anhydrous THF in a 100 mL round bottom flask. The reaction flask was flushed with nitrogen and charged with p-benzoquinone dioxime (Sigma-Aldrich) (3 g, 21.72 mmol), followed by a catalytic quantity of dibutyltin dilaurate. The reaction was refluxed for an additional 5 hours under nitrogen. Consumption of the isocyanate (2275 cm$^{-1}$) was monitored using infrared spectroscopy. The solvents were removed under reduced pressure to give the product in a quantitative yield.

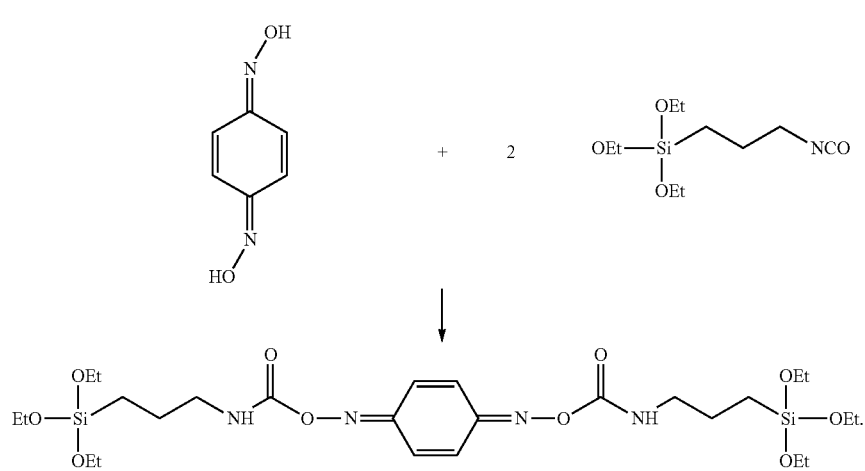

(5)

Formulations comprising the compounds of the invention were prepared as set out below, where compounds A to C are compounds of the invention as set out above. Compound E is Bis(trimethoxysilylpropyl)amine—commercially available from Sigma Aldrich. Compound has the formula:

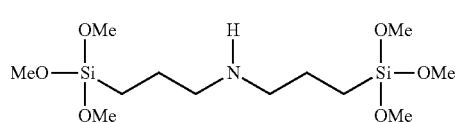

(E)

Natural Rubber Composition

Tests were carried out using natural rubber of the following composition:

| Ingredient | Parts by weight |
| --- | --- |
| Natural Rubber[a] | 100 |
| Zinc Oxide | 3.5 |
| Stearic Acid | 2 |
| Carbon Black[b] | 40 |
| Naphthenic Oil (low viscosity)[c] | 5 |
| 1,2-Dihydro-2,2,4-Trimethylquinoline[d] | 2 |
| N-(1,3-dimethylbutyl)-N'-phenyl-p-phenylenediamine[e] | 1 |
| Hydrocarbon Waxes[f] | 2 |

-continued

| Ingredient | Parts by weight |
| --- | --- |
| CBS | 0.7 |
| Sulphur | 2.5 |

[a]NR SMR CV 60
[b]SRF N762 black
[c]Oil Strukthene 410
[d]Flectol H
[e]Santoflex 13 (HPPD)
[f]Sunproof Improved Wax EPDM Rubber Composition Tests were carried out using EPDM rubber of the following composition:

| Ingredient | Parts by weight |
| --- | --- |
| Ethylene-Propylene-Ethylidene Norbornene (7.8% diene)[a] | 25 |
| Ethylene-Propylene-Ethylidene Norbornene (9.0% diene)[b] | 72.5 |
| Ethylene-Propylene-Dicyclopentadiene (10.5% diene)[c] | 25 |
| Carbon Black | 70 |
| Calcium Oxide | 10 |
| Stearic Acid | 1 |
| Zinc Oxide | 5 |
| Dicumyl peroxide[d] | 3.75 |
| Polyethylene Glycol[e] | 4.5 |

[a]Buna EP G 3850
[b]Buna EP G 3963
[c]Trilene 65
[d]Dicup 40C
[e]Carbowax 400

Compositions Used in Natural Rubber to Metal Bonding

| Formulation parts % by weight | Composition | | | | | | | |
| --- | --- | --- | --- | --- | --- | --- | --- | --- |
| | 1 | 2 | 3 | 4 | 5 | 6 | 7 | 8 |
| A | 5.25 | 5.25 | 5.49 | 5.49 | 5.56 | | | 5.36 |
| B | | | | | | 5.56 | | |
| C | | | | | | | 5.56 | |
| D[a] | 1.75 | 1.75 | 1.83 | 1.83 | 1.85 | 1.85 | 1.85 | 3.57 |
| Vinyltrimethoxy Silane | | | | | | | | 1.79 |

-continued

| Formulation parts % by weight | Composition | | | | | | | |
|---|---|---|---|---|---|---|---|---|
| | 1 | 2 | 3 | 4 | 5 | 6 | 7 | 8 |
| Hypalon 40s[b] | 5.46 | | | | | | | |
| Pergut[c] | | 5.46 | 1.17 | | | | | |
| Xylene[d] | 72.83 | 72.83 | 76.14 | | | | | |
| Isopropanol[d] | 14.71 | 14.71 | 15.37 | 91.58 | | | | |
| Ethanol:Water[e] | | | | | 92.59 | 92.59 | 92.59 | 89.28 |
| Acetic Acid | | | | 1.10 | | | | |
| % Rubber Failure | 90 | 100 | 100 | 85 | 100 | 98 | 98 | 98 |

[a]Bis(trimethoxysilylpropyl)amine
[b]Chlorosulfonated Polyethylene (DuPont Performance Elastomers)
[c]Chlorinated Natural Rubber (Bayer MaterialScience)
[d]Used as received
[e]Ethanol:water (95:5) adjusted to pH 4-5 with acetic acid Compositions Used in EPDM Rubber to Metal Bonding

| Formulation parts % by weight | Composition | |
|---|---|---|
| | 9 | 10 |
| Hypalon 40S[a] | 7.33 | 7.14 |
| Xylene[b] | 66.02 | 64.29 |
| Aerosil 200[c] | 1.22 | 1.79 |
| Heucophos ZPA[d] | 3.67 | 5.36 |
| GP205[e] | 9.78 | 14.28 |
| Elaztobond A250[f] | 3.67 | — |
| D | 8.31 | 7.14 |
| % Rubber Failure | 100 | 100 |

[a]Chlorosulfonated Polyethylene (DuPont Performance Elastomers)
[b]Used as received
[c]Hydrophilic Fumed Silica
[d]Zinc aluminium phosphate hydrate
[e]N,N'-4,4'-Diphenylmethane bismaleimide
[f]Resole resin To assess the efficacy of the adhesive systems described of the present invention in bonding rubbers to metal surfaces, a series of tests were performed according to the ASTM 429-B standard adjusted to a 45° angle. Metal substrates (2.54 cm (1 inch) wide, 10.16 cm (4 inch) long panels or coupons) were coated with the adhesive and adhered to natural rubber in a vulcanisation process. The natural rubber compositions were sulfur-cured compositions as set out in the Formulation tables.

The metal substrates were ultrasonically cleaned in an automated aqueous alkaline cleaner, rinsed with de-ionized water and blow-dried with hot air. The substrates may also be grit-blasted using a suitable abrasive agent.

Before application of the adhesive, 2.54 cm (1 inch) of length (and also 2.54 cm wide (1 inch) on both ends of the metal coupon was masked to prevent that region being available for bonding to the rubber, leaving a central area of 2.54 cm (1 inch) in width and 5.08 cm (2 inches) in length available to bond to the rubber.

In the bonding operation of the present invention, the compositions are applied to metal substrates by either a dipping, spraying or brush method to ensure an even coverage, preferably after the substrate has been cleaned.

Drying may be carried out under ambient conditions, that is room temperature. Solvent evaporation rate can be increased by heat, forced air or both.

A layer of uncured rubber was then placed on each coupon and cured in a standard hydraulic vulcanisation press for a period of time specified by the rubber's cure profile. In the case of the natural rubber used in the bonding process in the present invention, the rubber was cured for 20 minutes at 150° C. under a pressure of 20-30 Tonnes, to ensure intimate contact of the surfaces being bonded and the adhesive.

After curing the bonded samples were aged for 24 hours at room temperature before being subjected to testing and the tear pattern noted. Each sample was tested by the 45° angle modified ASTM 429-B standard using Instron test equipment (Instron tester, Model No. 5500R) at a steady load rate of 50 mm per minute until separation is complete.

"Rubber coverage" is the percentage of rubber remaining on the bonded metal substrate after peel testing. 100% rubber failure means that the rubber completely failed with no portion of the rubber peeling away from the surface of the metal (and equates to 100% rubber failure).

Results

Generally it is desirable that the rubber substrate fails before the metal to rubber bond fails. The result is achieved with certain of the formulations as set out above.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment Conversely, various features of the invention which are, for brevity, described in the context of a single embodiment, may also be provided separately or in any suitable sub-combination.

The invention claimed is:

1. A compound comprising:
    a) at least one alkoxy silane moiety; and
    b) at least one moiety selected from a nitrosobenzene, a nitrosobenzene precursor and combinations thereof.

2. A compound according to claim 1 wherein said nitrosobenzene precursor is at least one of a quinone dioxime or a quinone oxime.

3. A compound according to claim 1 wherein said alkoxy silane moiety is of the structure:

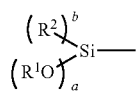

wherein 'a' is 1-3 and 'b' is 0-2, but if a=3, b=0; or if a=2, b=1; so that at least one alkoxy group is present;
R$^1$ is selected from the group consisting of H, C$_1$-C$_{24}$ alkyl, and C$_3$-C$_{24}$ acyl, and wherein when a≧1 at least one R$^1$ is not hydrogen; and
R$^2$ is selected from C$_1$-C$_{24}$ alkyl and C$_3$-C$_{24}$ acyl.

4. A compound according to claim 1 wherein the compound takes the form of a reaction product of an isocyanate or isothiocyanante with an active hydrogen compound.

5. A compound according to claim 4 embraced by the general structure:

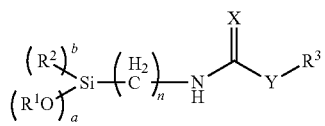

wherein n can be 1-5;
'a' is 1-3 and 'b' is 0-2; but if a=3, b=0; or if a=2, b=1; so that at least one alkoxy group is present;
R$^1$ is selected from the group consisting of H, C$_1$-C$_{24}$ alkyl, and C$_3$-C$_{24}$ acyl, and wherein when a≧1 at least one R$^1$ is not hydrogen;
R$^2$ is selected from C$_1$-C$_{24}$ alkyl and C$_3$-C$_{24}$ acyl;
X is O or S;
Y is —O—, —S—, or —N(R$^3$); and
R$^3$ is a moiety comprising nitrosobenzene, quinone dioxime or quinone oxime.

6. A compound according to claim 5 wherein R$^3$ is (showing linkage through Y):

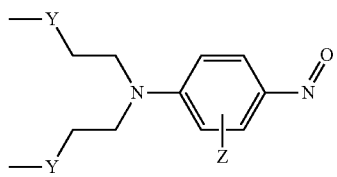

wherein Z indicates that the ring of the above structure can optionally be mono-, di-, tri- or tetrasubstituted with the group consisting of alkyl, cycloalkyl, alkoxy, aralkyl, alkaryl, arylamine, arylnitroso, amino, halogen and combinations thereof, and further wherein the substituents can either be the same or different on each carbon atom of the ring.

7. A compound according to claim 5 wherein R$^3$ is (showing linkage through Y):

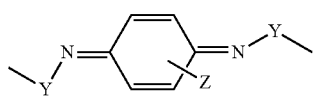

wherein Z indicates that the ring of the above structure can optionally be mono-, di-, tri- or tetrasubstituted with the group consisting of alkyl, cycloalkyl, alkoxy, aralkyl, alkaryl, arylamine, arylnitroso, amino, halogen and combinations thereof, and further wherein the substituents can either be the same or different on each carbon atom of the ring.

8. A compound according to claim 5 wherein R$^3$ is (showing linkage through Y):

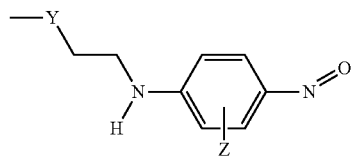

wherein Z indicates that the ring of the above structure can optionally be mono-, di-, tri- or tetrasubstituted with the group consisting of alkyl, cycloalkyl, alkoxy, aralkyl, alkaryl, arylamine, arylnitroso, amino, halogen and combinations thereof, and further wherein the substituents can either be the same or different on each carbon atom of the ring.

9. A compound according to claim 5 wherein R$^3$ is (showing linkage through Y):

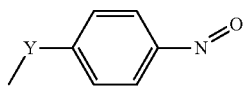

wherein Z indicates that the ring of the above structure can optionally be mono-, di-, tri- or tetrasubstituted with the group consisting of alkyl, cycloalkyl, alkoxy, aralkyl, alkaryl, arylamine, arylnitroso, amino, halogen and combinations thereof, and further wherein the substituents can either be the same or different on each carbon atom of the ring.

10. A compound according to claim 5 wherein R$^3$ is (showing linkage through Y):

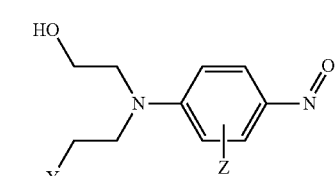

wherein Z indicates that the ring of the above structure can optionally be mono-, di-, tri- or tetrasubstituted with the group consisting of alkyl, cycloalkyl, alkoxy, aralkyl, alkaryl, arylamine, arylnitroso, amino, halogen and combinations thereof, and further wherein the substituents can either be the same or different on each carbon atom of the ring.

11. A compound according to claim 1 of the general structure;

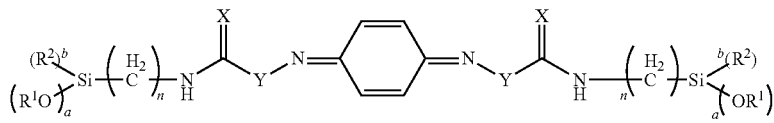

wherein n is 1-5;
'a' is 1-3 and 'b' is 0-2; 'a' is 1-3 and 'b' is 0-2; but if a=3, b=0; or if a=2, b=1; so that at least one alkoxy group is present;
$R^1$ is selected from the group consisting of H, $C_1$-$C_{24}$ alkyl, and $C_3$-$C_{24}$ acyl, and wherein when a≧1 at least one $R^1$ is not hydrogen;
$R^2$ is selected from $C_1$-$C_{24}$ alkyl and $C_3$-$C_{24}$ acyl;
X is O or S; and
Y is —O, —S, or —NH$_x$, wherein x=1 or 2.

12. An oligomer or a co-oligomer of a compound according to claim 1.

13. An oligomer or a co-oligomer according to claim 12 which has the general structure formula:

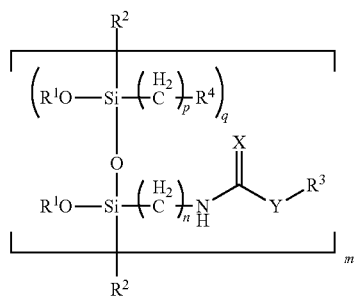

wherein m is 1-100; n is 1-5; p is 1-5; q is 0-50; and if q=0, m≧2
$R^1$ is selected from the group consisting of H, $C_1$-$C_{24}$ alkyl, and $C_3$-$C_{24}$ acyl;
$R^2$ is selected from the group consisting of $OR^1$, $C_1$-$C_{24}$ alkyl and $C_3$-$C_{24}$ acyl, and wherein when $R^2$=$OR^1$ at least one $R^1$ is not hydrogen;
$R^4$ is selected from the group consisting of acrylate, aldehyde, amino, anhydride, azide, maleimide, carboxylate, sulphonate, epoxide, ester functional, halogens, hydroxyl, isocyanate or blocked isocyanate, sulphur functional, vinyl and olefin functional, or polymeric structures;
X is O or S;
Y is –O, —S, or —NH$_x$ (where x=1 or 2); and
$R^3$ is a moiety comprising nitrosobenzene, quinone dioxime or quinone oxime.

14. A composition for bonding substrates together comprising:
i) at least one compound comprising:
a) at least one alkoxy silane moiety;
b) at least one moiety selected from a nitrosobenzene, a nitrosobenzene precursor and combinations thereof; and
ii) a carrier vehicle for the compound.

15. A process for bonding two substrates together comprising:
applying a composition comprising:
a) at least one alkoxy silane moiety; and
b) at least one moiety selected from a nitrosobenzene, a nitrosobenzene precursor and combinations thereof;
to at least one of the substrates and bringing the substrates together.

16. A process according to claim 15 wherein a first substrate comprises a natural or synthetic rubber to be bonded to another substrate.

17. A process according to claim 16 wherein the rubber substrate is vulcanised/crosslinked prior to bonding to the metal surface.

18. A process according to claim 16 wherein the rubber is vulcanised/crosslinked concurrently with bonding to the metal surface.

19. A process according to claim 15 wherein a first substrate comprises a natural or synthetic rubber to be bonded to a second substrate and the second substrate is a metallic substrate.

20. A process according to claim 15 wherein said moiety selected from a nitrosobenzene or a nitrosobenzene precursor becomes anchored to the rubber.

21. A combination of at least two substrates bound together by an adhesive composition comprising:
at least one alkoxy silane moiety; and
at least one moiety selected from a nitrosobenzene or a nitrosobenzene precursor and combinations thereof.

* * * * *